United States Patent
Kaczorowski

(10) Patent No.: US 7,249,738 B2
(45) Date of Patent: Jul. 31, 2007

(54) ROLLING BRACKET ASSEMBLY

(76) Inventor: Raymond Kaczorowski, 1509 Hendry Ave., Savannah, GA (US) 31406

( * ) Notice: Subject to any disclaimer, the term of this patent is extended or adjusted under 35 U.S.C. 154(b) by 81 days.

(21) Appl. No.: 11/193,558

(22) Filed: Jul. 29, 2005

(65) Prior Publication Data

US 2007/0023589 A1    Feb. 1, 2007

(51) Int. Cl.
*A47K 1/04*    (2006.01)
(52) U.S. Cl. ............... 248/129; 248/346.11; 280/79.11
(58) Field of Classification Search ............... 248/129, 248/346.01, 346.06, 346.07, 346.11, 346.5; 280/62, 79.11
See application file for complete search history.

(56) References Cited

U.S. PATENT DOCUMENTS

| | | | | |
|---|---|---|---|---|
| 3,837,666 A | * | 9/1974 | Hodson | 280/47.131 |
| 4,572,531 A | * | 2/1986 | Elia | 280/62 |
| 4,804,162 A | * | 2/1989 | Rice | 248/671 |
| 4,934,720 A | * | 6/1990 | Dobron | 280/79.11 |
| RE34,130 E | * | 11/1992 | Berfield et al. | 280/79.5 |
| 5,165,632 A | * | 11/1992 | Kuan | 248/129 |
| 6,729,632 B2 | * | 5/2004 | Ferrigan | 280/79.7 |
| 2006/0103092 A1 | * | 5/2006 | Strahler et al. | 280/79.11 |

* cited by examiner

*Primary Examiner*—Ramon O Ramirez
(74) *Attorney, Agent, or Firm*—Needle & Rosenberg, P.C.

(57) ABSTRACT

A rolling bracket assembly for use in transporting loads of various size and shape. The rolling bracket assembly comprises at least one base assembly. The base assembly is adapted for engagement with at least a portion of an underside of a skid and comprises a wheel assembly adapted to ambulate the load being transported. The bracket assembly may also comprise two base assemblies connected by an elongate connector.

23 Claims, 7 Drawing Sheets

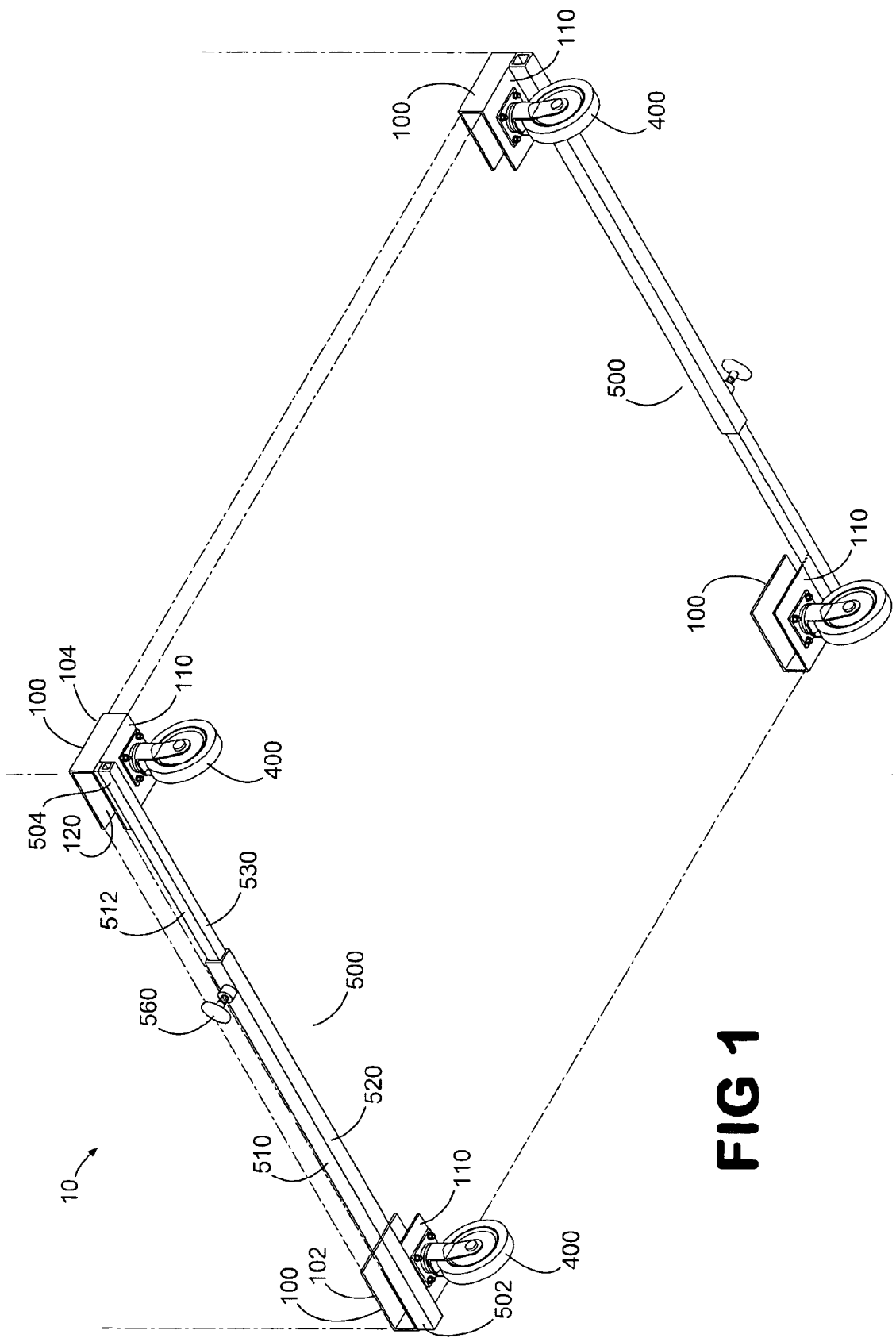

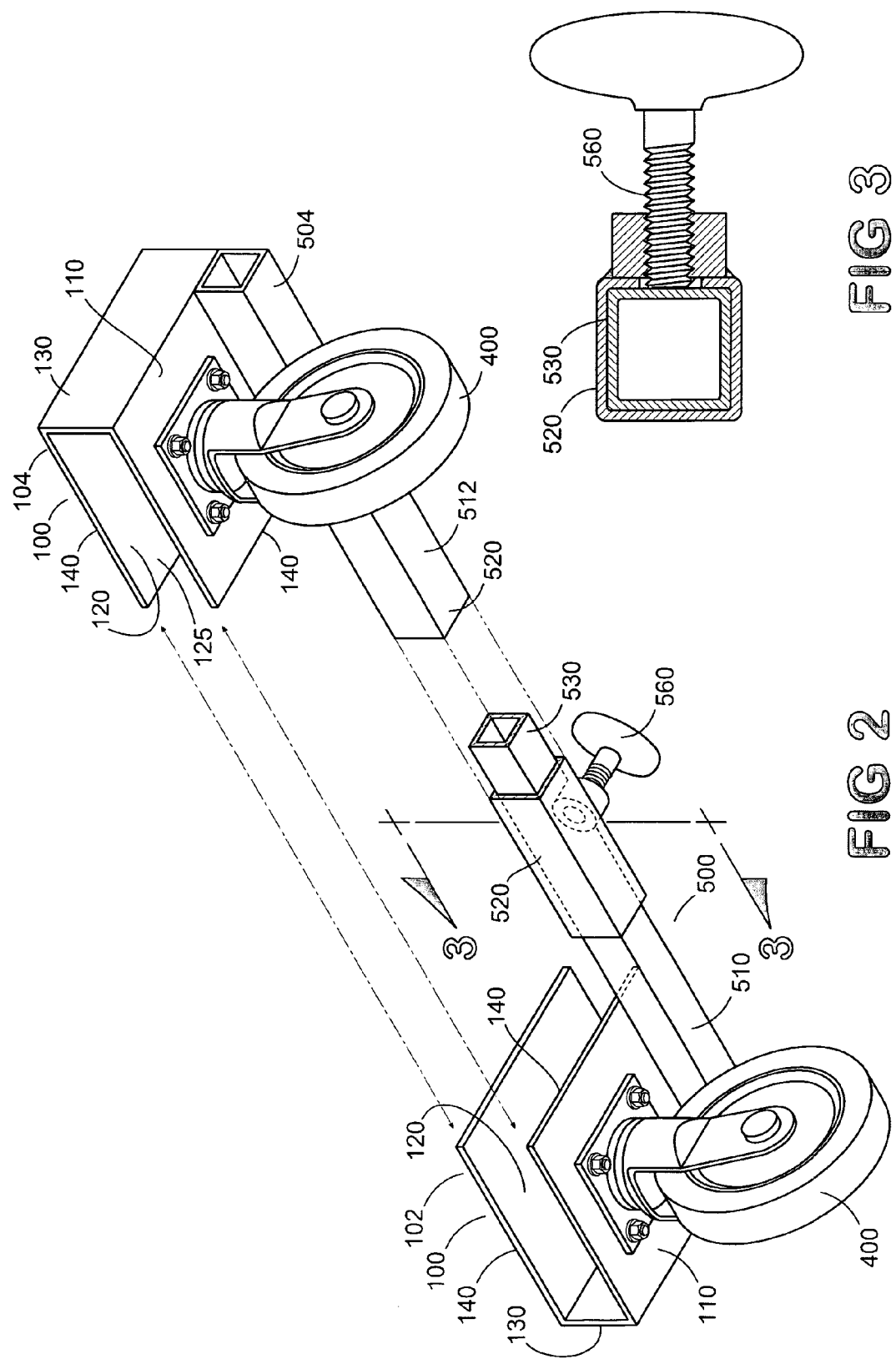

ROLLING BRACKET ASSEMBLY

FIELD OF THE INVENTION

The present invention pertains to a rolling bracket system. More specifically, the invention relates to an adjustable rolling bracket system capable of being adapted to various equipment, freight, bulky or heavy items.

DETAILED DESCRIPTION OF THE DRAWINGS

These and other features of the preferred embodiments of the present invention will become more apparent in the detailed description, in which reference is made to the appended drawings wherein:

FIG. 1 is a bottom perspective view of an embodiment of the rolling bracket assembly according to the present invention showing two sets of base members, each set connected with an elongate connector.

FIG. 2 is a bottom perspective view of the rolling bracket assembly according to the present invention showing the elongate connector with a first elongate section releasably secured to a second elongate section.

FIG. 3 is a side cross-sectional view of the securing mechanism of the rolling bracket assembly according to the present invention taken along line 3-3 of FIG. 2.

DETAILED DESCRIPTION OF THE INVENTION

Figure 4:
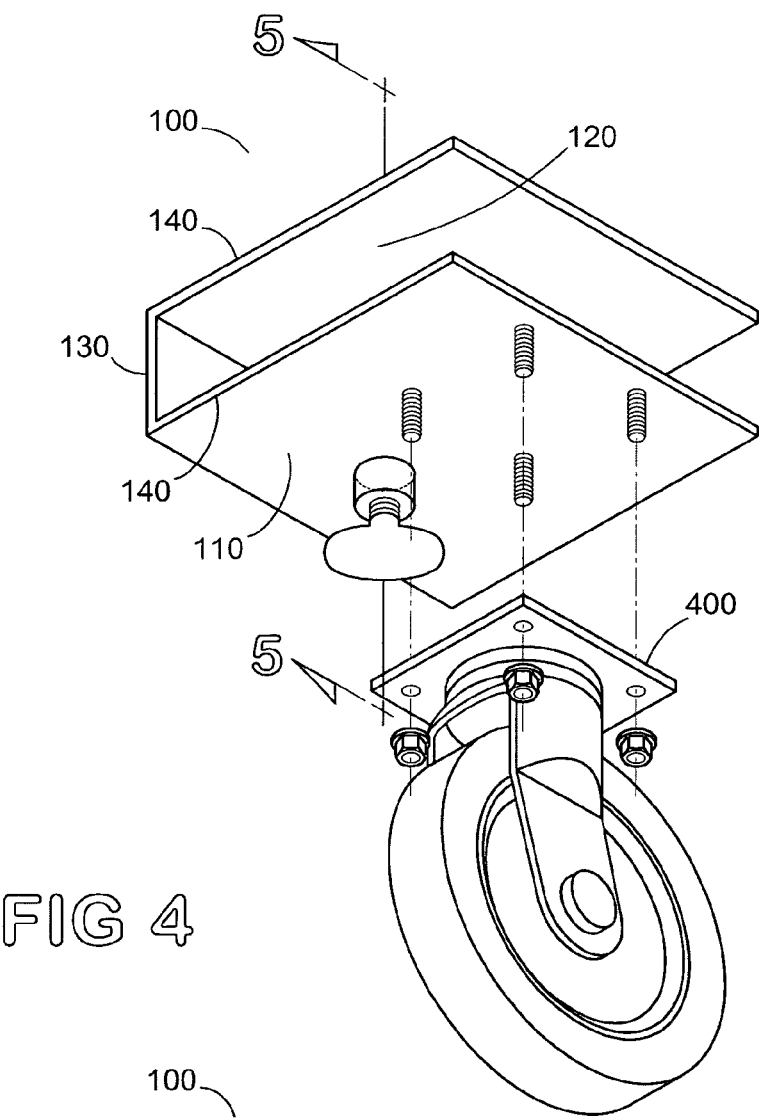
FIG. 4 is an exploded bottom perspective view of the rolling bracket assembly according to the present invention showing a base assembly and a wheel assembly.
Figure 5:
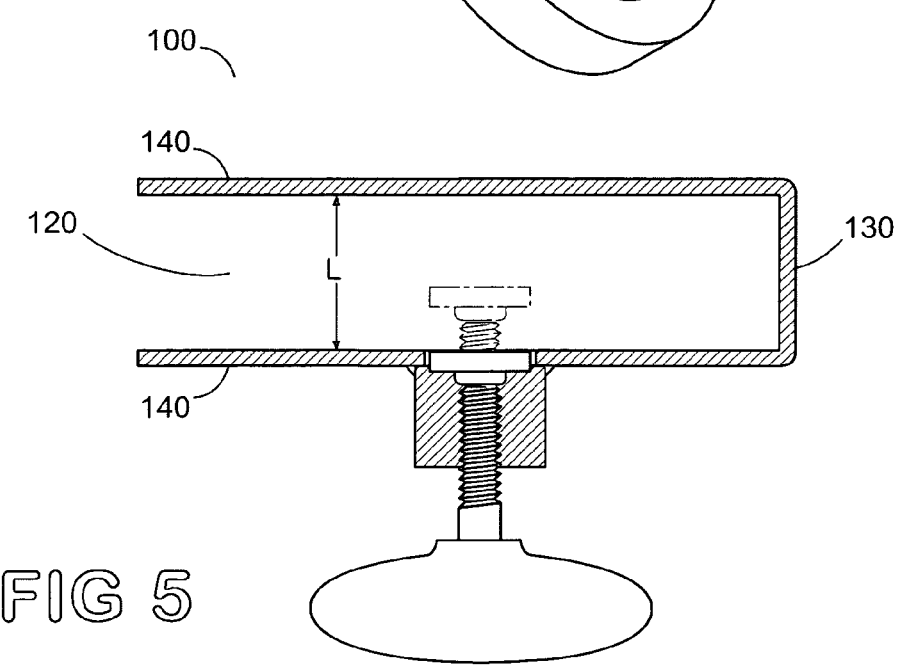
FIG. 5 is a partial side cross-section view of the base member of the rolling bracket assembly of the present invention taken along line 5-5 of FIG. 4.

Before the present articles, devices, assemblies and/or methods are disclosed and described, it is to be understood that this invention is not limited to the specific articles, devices, assemblies and/or methods disclosed unless otherwise specified, as such may, of course, vary. It is also to be understood that the terminology used herein is for the purpose of describing particular embodiments only and is not intended to be limiting.

As used herein, the singular forms "a," "an" and "the" include plural referents unless the context clearly dictates otherwise. The embodiments are described with reference to the figures, in which like numbers indicate like parts throughout the figures.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The invention is a rolling bracket assembly 10 for use in transporting loads of various size and shape. In one aspect, the rolling bracket assembly 10 comprises a base assembly 100 having a bottom surface 110 and defining an interior slot 120. The interior slot 120 is adapted for engagement with at least a portion of an underside of a skid. The term "skid" is a term well know in the art and may be a platform on which material is set for handling and moving. As one skilled in the art would know, a skid may be constructed in various fashions and may comprise a variety of materials. For example, and not meant to be limiting, a skid may comprise iron, steel, wood, or plastic.

In one aspect, the base assembly 100 is substantially U-shaped in cross-section, having a base 130 and two spaced legs 140 extending outwardly therefrom the base 130. In this embodiment, the base and two spaced legs 140 define the interior slot 120 that is adapted for engagement with at least a portion of the underside of the skid. The two spaced legs are oriented substantially parallel to each other such that one leg of the base assembly 100 forms the bottom surface 110.

The distance L between the two spaced legs 140 can be determined by the dimensions of the load that the operator wishes to transport. In one aspect, the distance L is between about ½" and about 7." In another aspect, the distance L is about 1½". In yet another aspect, the distance L is about a dimension of stock lumber. Skids are customarily built using common lumber sizes. The distance L between the two spaced legs 140 would be sized accordingly.

Additionally, the interior slot 120 of the base assembly 100 may also have a surface 125 that is constructed to frictionally engage at least a portion of the underside of a skid. In one aspect, at least a portion of this surface 125 may be abraded or it may have teeth-like protrusions adapted to frictionally engage the skid. In one aspect, as illustrated in FIG. 1, the interior slot is substantially horizontal.

Figure 6:
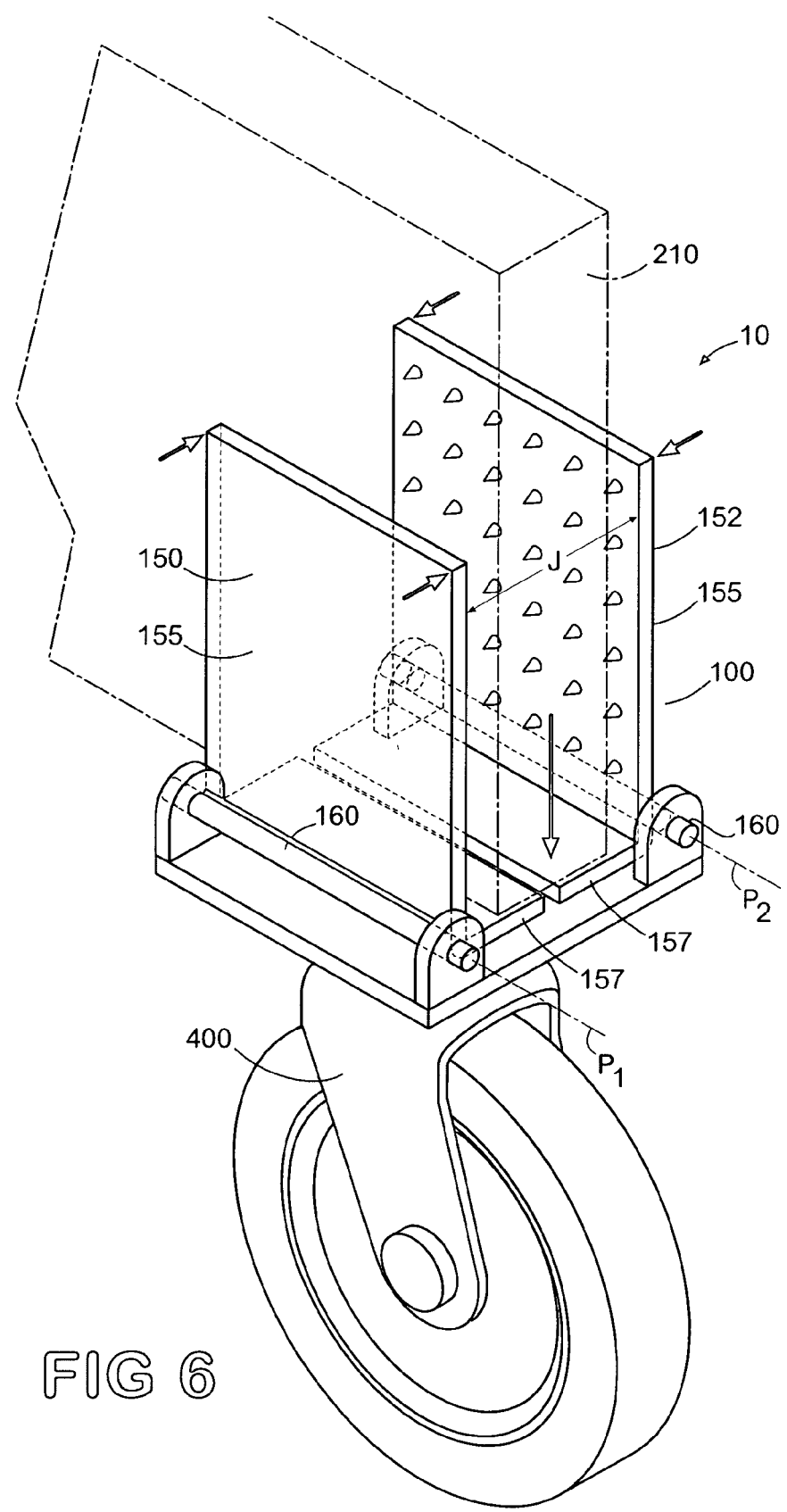
FIG. 6 is a perspective view of the rolling bracket assembly of the present invention showing a base assembly with a first L-shaped jaw member and a second L-shaped jaw member.

In another embodiment, as illustrated in FIG. 6, the invention is rolling bracket assembly for transporting a load having at least one downwardly protruding member 210. The downwardly protruding member could be a leg, merely a supporting board, or any other downwardly protruding portion of the load to be transported. In this aspect, the bracket assembly comprises a base assembly 100 that has a bottom surface 110. In this aspect, the bracket assembly 10 also comprises a first L-shaped jaw member 150 and a second L-shaped jaw member 152. Each respective jaw member comprises an elongate body portion 155 and a leg portion 157. Each jaw member is pivotally attached to at least a portion of the base member such that a pivot axis P1 of the first jaw member is substantially parallel to a pivot axis P2 of the second jaw member. For example, if the jaw members were secured at the pivot point by a pin 160, the pins 160 would be substantially parallel. The leg portion 157 of the first jaw member substantially faces the leg portion 157 of the second jaw member and the pivot axes of the jaw members are spaced apart a predetermined distance J. The distance J is set such that, in use, the jaw members pivot inwardly toward one another to frictionally engage a portion of the downwardly protruding member 210 of the load.

Figure 8:
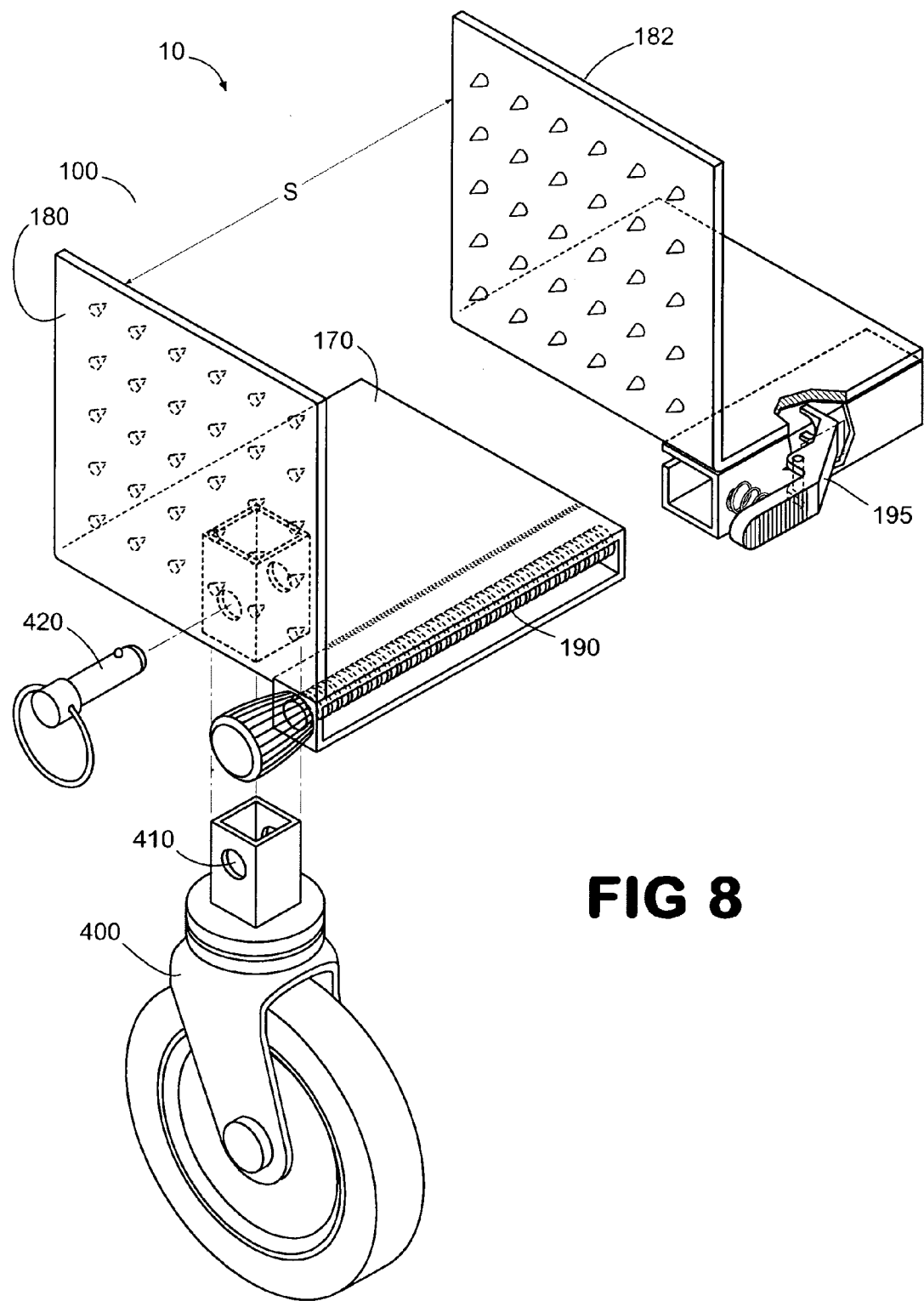
FIG. 8 is an exploded perspective view of the rolling bracket assembly of the present invention showing a base assembly having a top surface, a bottom surface and two side members.
Figure 9:
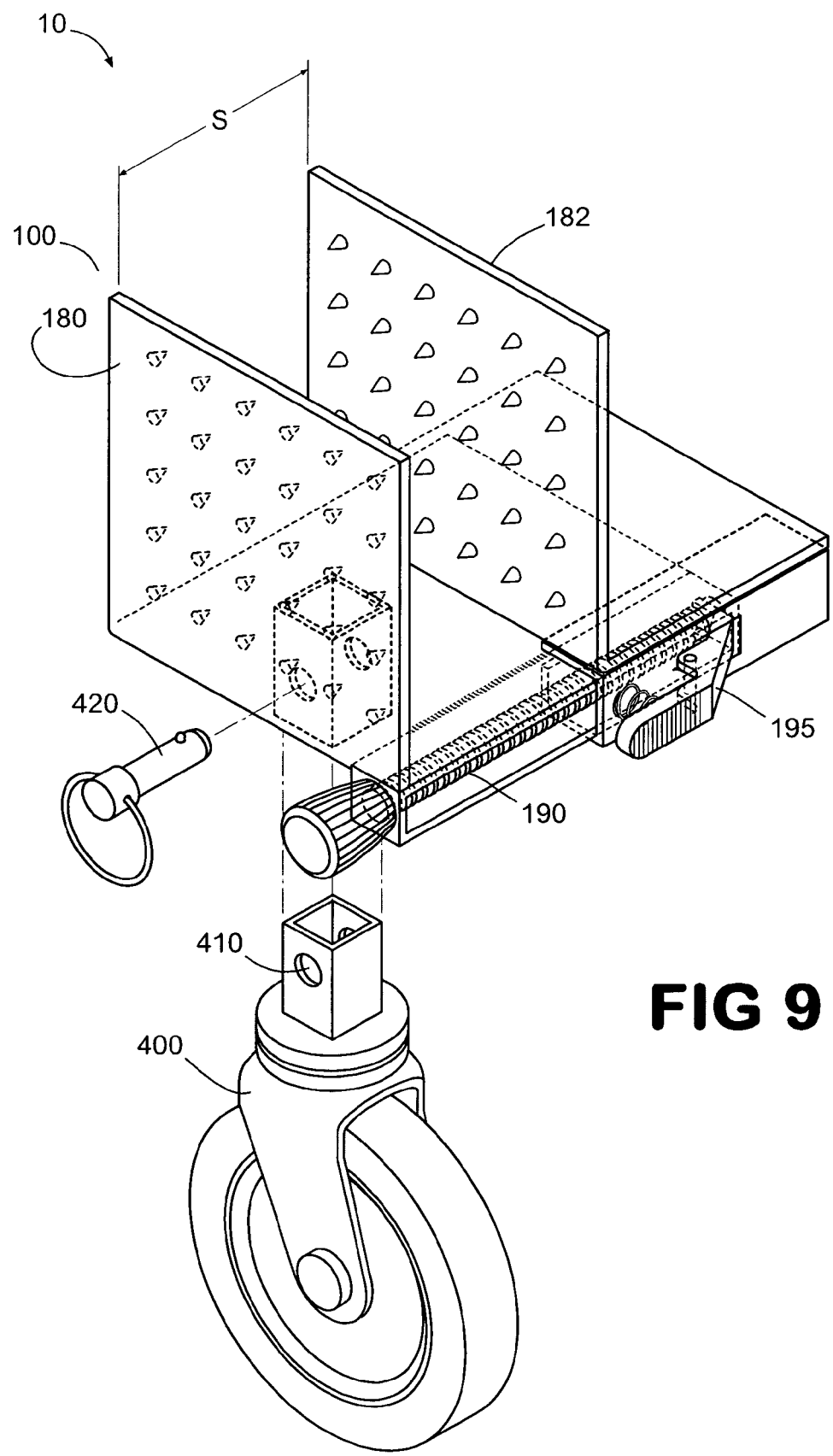
FIG. 9 is an exploded perspective view of the rolling bracket assembly of FIG. 8 showing a second side member slidably engaged on the top surface of the base assembly.

In an additional embodiment, as shown in FIGS. 8 and 9, the rolling bracket assembly is adapted to transport a load having at least one downwardly protruding member 210. In this aspect, the bracket assembly 10 comprises a base assembly 100 having a top surface 170, a bottom surface 110, and a first side member 180. The first side member 180 extends upwardly away from and substantially transverse to the top surface 170. In this aspect, the bracket assembly 10 also comprises a second side member 182 coupled thereto the base assembly and is positioned substantially parallel to the first side member. Here, the first and second side members are adapted to engage the downwardly protruding member of the load.

In another aspect, the second side member 182 is slidably connected to a portion of the base member such that it is movable along the top surface 170 of the base member in slidable relation to the first side member 180. As shown in FIGS. 8 and 9, the distance S between each respective side member is varied according to the load being transported.

In yet another aspect, the second side member 182 is securable to the base member, thereby fixing the second side member 182 in relation to the first side member 180. As one skilled in the art would realize, this securable relation can be achieved in any conventional manner. Referring to FIGS. 8 and 9, for example and not meant to be limiting, the base member may comprise a threaded rod 190 and the second side member may be equipped with a complementary engagement mechanism 195. In this example, the engagement mechanism 195 is adapted to engage the threads of the threaded rod 190 such that rotation of the rod in a first direction would decrease the distance S between the first and second side members. Similarly, rotation of the rod in a second direction would increase the distance S between the first and second side members. Additionally, the engagement mechanism may be spring loaded to release the threaded rod completely.

Figure 7:
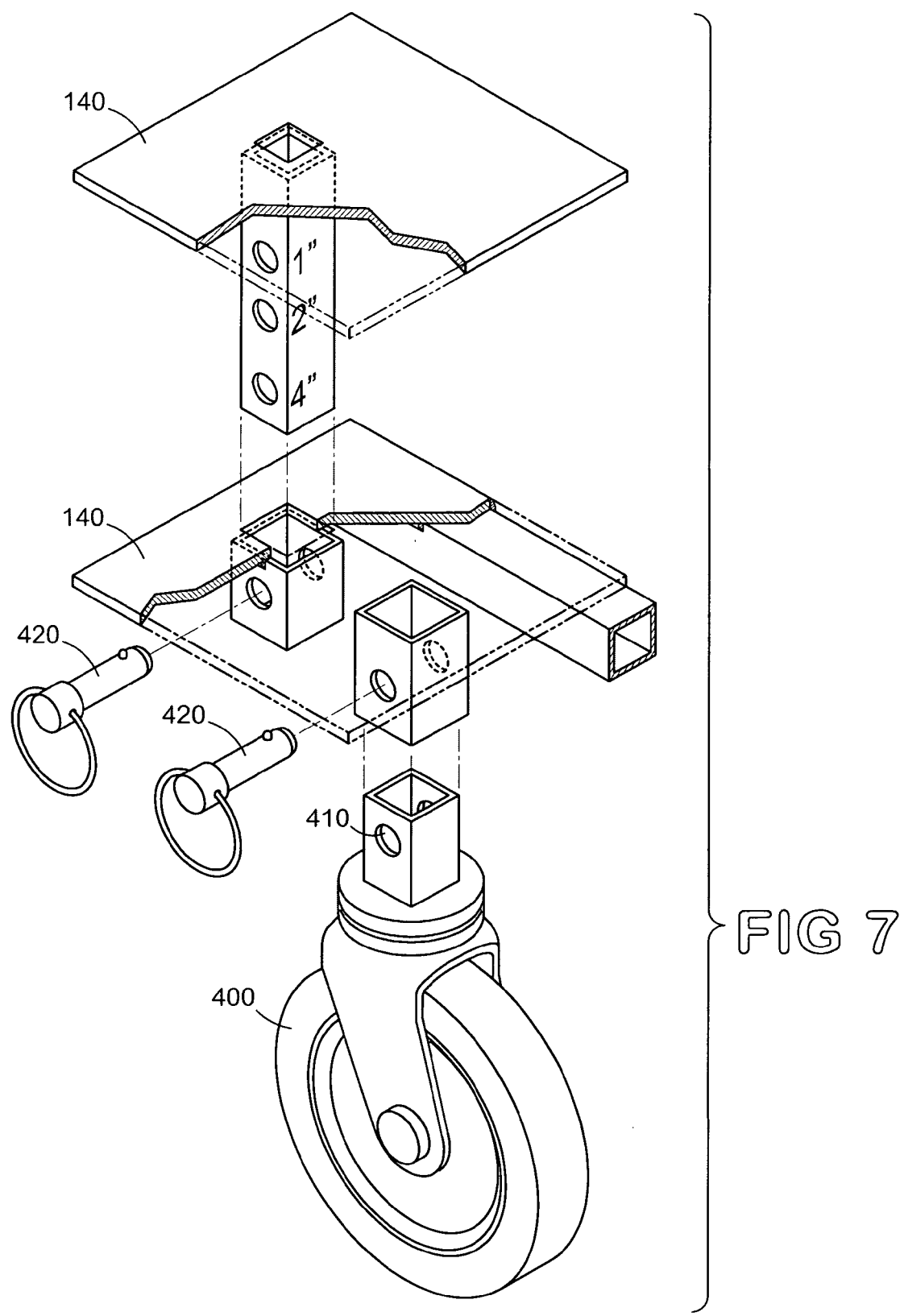
FIG. 7 is an exploded perspective view of the rolling bracket assembly of the present invention showing a base assembly having a two spaced legs.

In each of the above described embodiments, the rolling bracket assembly may also comprise a wheel assembly 400 attached thereto at least a portion of the base assembly 100. The wheel assembly 400 is attached such that at least a portion of it extends below a plane formed by the bottom surface 110 of the base assembly. In one aspect, the wheel assembly is attached thereto at least a portion of the bottom surface 110 of the base assembly 100. In another aspect, the wheel assembly is pivotally attached thereto at least a portion of the bottom surface 110 of the base assembly 100. In this aspect, common caster wheels may be used. In yet another aspect, the wheel assembly 400 may be releasably connected to a portion of the base assembly. As can be seen in FIG. 7, the releasable connection may be achieved in any conventional manner, such as, but not limited to, concentric bores 410 with complementary cylindrical pins 420.

In yet another aspect of the invention, the base assembly 100 comprises a first base assembly 102 and a second base assembly 102. In this aspect, the rolling bracket assembly 10 further comprises an elongate connector 500 having a first end 502 and a second end 504. Furthermore, in this aspect, the first end 502 of the elongate connector is connected to the first base assembly 102 and the second end 504 of the elongate connector is connected to the second base assembly 102. The elongate connector 500 provides stability for the rolling bracket assembly when it is attached to its load.

In another aspect of the invention, the elongate connector 500 comprises a first elongate section 510 and a second elongate section 512. In this facet, the proximal end of the first elongate section 510 is connected to the first base assembly 102 and the proximal end of the second elongate section 512 is connected to the second base assembly 102. In use, the first elongate section 502 is substantially coaxial with the second elongate section 512 and the distal ends of each of the first and second elongate sections are positioned such that they substantially overlap. In this fashion, the length of the overall elongate connector is variable in order to correspond to various widths of prospective loads.

As one skilled in the art can appreciate, there are many ways to vary the length of the elongate connector 500. For example, in one aspect, the first elongate section 510 comprises a tubular sleeve member 520 and the second elongate 512 section comprises a rod member 530. The rod member 530 is sized for complimentary, slidable engagement with a distal end portion of the tubular sleeve member 520. However, any complimentary arrangement will suffice.

In yet another aspect, the first elongate section of the rolling bracket assembly is secured to a portion of the second elongate section. The securing fashion can be permanent, or the first elongate section can be releasably secured to a portion of the second elongate section. As an example, and not meant to be limiting, the two elongate sections may have a plurality of bores 540 defined therethrough and a pin 550 sized and shaped for insertion into a bore 540 of each elongate section when the respective bores are concentric. In another example, wherein the elongate sections comprise a tubular sleeve member and a rod member, the sleeve member may define a plurality of bores sized and shaped for insertion of one or more set screws 560 that, when inserted, frictionally engage the rod therein the sleeve. In other examples, the means for securing may include any common means, such as clasps, clamps, bolts and nuts, pins, rivets, screws, and the like.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

I claim:

1. A rolling bracket assembly comprising:
    a base assembly having a bottom surface and defining an interior slot, the interior slot is adapted for engagement with at least a portion of an underside of a skid, wherein the base assembly comprises a first base assembly and a second base assembly;
    an elongate connector having a first end and a second end, the first end of the elongate connector being connected thereto the first base assembly and the second end of the elongate connector being connected thereto the second base assembly; and
    a wheel assembly attached thereto at least a portion of the base assembly such that at least a portion of the wheel assembly extends below a plane formed by the bottom surface of the base assembly.

2. The rolling bracket assembly of claim 1, wherein the interior slot is substantially horizontal.

3. The rolling bracket assembly of claim 1 wherein the elongate connector comprises a first elongate section and a second elongate section, each respective elongate section comprising a proximal end and a distal end, wherein the proximal end of the first elongate section is connected to the first base assembly and the proximal end of the second elongate section is connected to the second base assembly, wherein the first elongate section is substantially coaxial with the second elongate section, and wherein the distal ends of each of the first and second elongate sections are positioned such that they substantially overlap.

4. The rolling bracket assembly of claim 3, wherein the first elongate section comprises a tubular sleeve member and the second elongate section comprises a rod member sized for complimentary slidable engagement with a distal end portion of the tubular sleeve member.

5. The rolling bracket assembly of claim 3, further comprising a means for securing a portion of the first elongate section to a portion of the second elongate section.

6. The rolling bracket assembly of claim 3, wherein a portion of the first elongate section is releasably secured to a portion of the second elongate section.

7. The rolling bracket assembly of claim 1, wherein the base assembly is substantially U-shaped having a base and two spaced legs extending outwardly therefrom the base.

8. The rolling bracket assembly of claim 7, wherein the two spaced legs are oriented substantially parallel to each other.

9. The rolling bracket assembly of claim 8, wherein the two spaced legs are spaced apart a predetermined distance, wherein the predetermined distance is between about ½" and about 7".

10. The rolling bracket assembly of claim 9, wherein the predetermined distance is about 1½".

11. The rolling bracket assembly of claim 9, wherein the predetermined distance is about a dimension of stock lumber.

12. The rolling bracket assembly of claim 1, wherein the wheel assembly is releasably connected thereto at least a portion of the base assembly.

13. The rolling bracket assembly of claim 1, wherein the interior slot of the base assembly is constructed and arranged for frictional engagement with at least portion of an underside of a skid.

14. The rolling bracket assembly of claim 1, wherein the wheel assembly is attached thereto at least a portion of the bottom surface of the base assembly.

15. The rolling bracket assembly of claim 14, wherein the wheel assembly is pivotally attached thereto at least a portion of the bottom surface of the base assembly.

16. A rolling bracket assembly comprising:
- a first base assembly and a second base assembly, each base assembly comprising a base and two spaced legs that extend outwardly therefrom the base, wherein the base and two spaced legs define a slot adapted for engagement with at least a portion of an underside of a skid, and wherein one leg of the base assembly forms a bottom surface;
- an elongate connector having a first end and a second end, wherein the first end of the elongate connector is attached thereto the first base assembly and the second end of the elongate connector is attached thereto the second base assembly; and
- a wheel assembly attached thereto at least a portion of the bottom surface of each base assembly such that at least a portion of the wheel assembly extends below a plane formed by the bottom surface of the base assembly.

17. The rolling bracket assembly of claim 16, wherein each respective first and second base assembly has a U-shaped cross-section.

18. The rolling bracket assembly of claim 16, wherein each respective first and second base assembly face each other.

19. The rolling bracket assembly of claim 16, wherein the elongate connector comprises a means for varying the length of the elongate connector.

20. The rolling bracket assembly of claim 16, wherein the slot of the base assembly is constructed and arranged for frictional engagement with a portion of an underside of a skid.

21. The rolling bracket assembly of claim 16, wherein at least one wheel assembly is pivotally attached thereto a portion of the bottom surface of each respective first and second base assembly.

22. The rolling bracket assembly of claim 16, wherein the two spaced legs are oriented substantially parallel to each other.

23. A rolling bracket assembly comprising:
- a base assembly having a bottom surface and defining an interior slot, the interior slot is adapted for engagement with at least a portion of an underside of a skid, wherein the base assembly is substantially U-shaped having a base and two spaced legs extending outwardly therefrom the base; and
- a wheel assembly attached thereto at least a portion of the base assembly such that at least a portion of the wheel assembly extends below a plane formed by the bottom surface of the base assembly.

* * * * *